United States Patent [19]

Tomiyama

[11] Patent Number: 4,513,213
[45] Date of Patent: Apr. 23, 1985

[54] PRESSURE DENSITY EQUALIZING APPARATUS FOR TWO VESSELS

[75] Inventor: Tadao Tomiyama, Kakogawa, Japan

[73] Assignee: Mitsubishi Denki Kabushiki Kaisha, Tokyo, Japan

[21] Appl. No.: 439,715

[22] Filed: Nov. 4, 1982

[30] Foreign Application Priority Data

Nov. 16, 1981 [JP] Japan .................. 56-171031

[51] Int. Cl.³ .............................. H02K 9/26
[52] U.S. Cl. .................. 310/156; 165/104.34
[58] Field of Search ............ 310/52, 53, 55, 56, 310/57, 58, 59, 60 R, 62, 63, 64, 65, 112, 114; 165/104.34

[56] References Cited

U.S. PATENT DOCUMENTS

| | | | |
|---|---|---|---|
| 3,024,366 | 3/1962 | Yanagimachi | 310/55 |
| 3,258,619 | 6/1966 | Davidson | 310/56 |
| 3,384,769 | 5/1968 | Schaefer | 310/87 |

FOREIGN PATENT DOCUMENTS

| | | | |
|---|---|---|---|
| 91649 | 7/1981 | Japan | 310/56 |
| 276654 | 9/1968 | United Kingdom | 310/56 |

*Primary Examiner*—R. Skudy
*Attorney, Agent, or Firm*—Wenderoth, Lind & Ponack

[57] ABSTRACT

A pressure density equalizing apparatus for two vessels each containing a gas coolant therein and provided with a gas drier therefor is provided wherein the gas drier to be supplied with the gas coolant under high pressure from one of the vessels is in communication with the other of the vessels through a low pressure gas pipe, whereas the other gas drier to be supplied with the gas coolant under high pressure from the other of the vessels is in communication with the first mentioned vessel through a further low pressure gas pipe.

2 Claims, 2 Drawing Figures

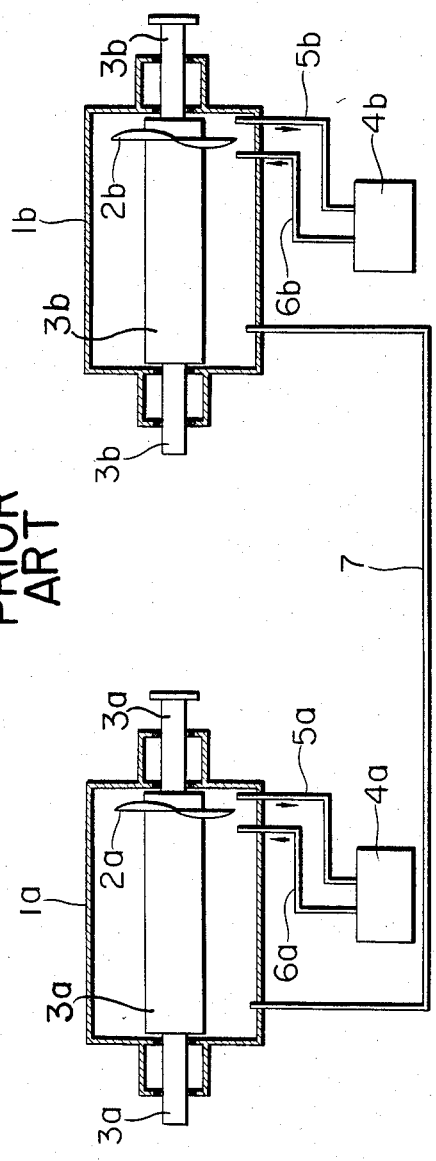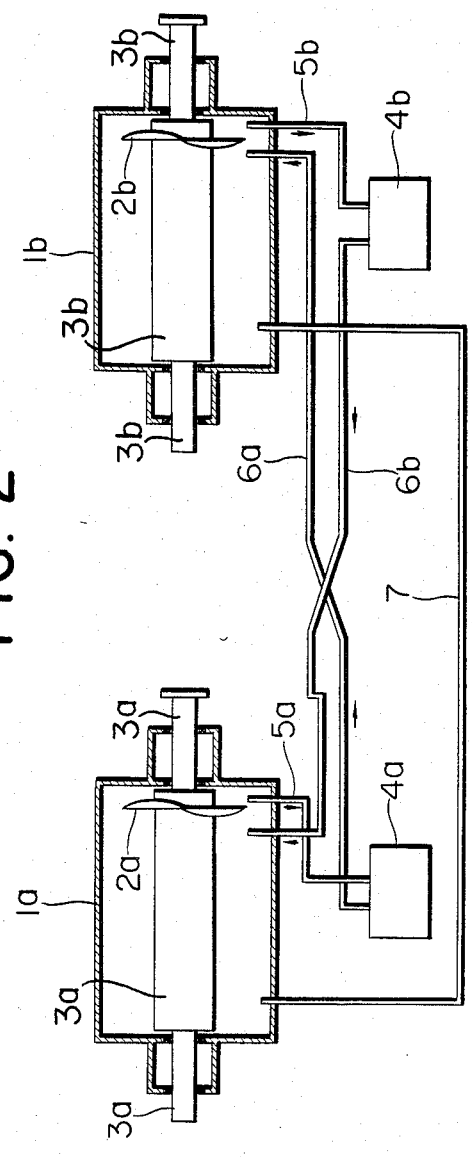

PRESSURE DENSITY EQUALIZING APPARATUS FOR TWO VESSELS

BACKGROUND OF THE INVENTION

1. Field of the Invention

The present invention relates to a pressure density equalization apparatus and more particularly to a pressure density equalization apparatus for two rotary electric machines in order that the pressure densities of the cooling gases enclosed in the hermetically sealed vessels each pertaining to the rotary electric machines, respectively, can be equalized.

2. Description of the Prior Art

In a turbine generator as a rotary electric machine it has been common practice to cool it by a hydrogen gas, and the hydrogen gas itself is adapted to be cooled by drying through suitable means.

The present invention principally concerns the equalization between the pressure densities of the gases, e.g. the hydrogen contained in two hermetic vessels within which rotary electric machines are mounted for rotation, and which are each provided with gas driers for the cooling gases.

FIG. 1 of the attached drawings schematically indicates a conventional pressure density equalizing apparatus as used for cooling two turbine generators using hydrogen gas as a cooling medium.

Enclosed within first and second vessels $1a$ and $1b$ are e.g. hydrogen gases for cooling first and second turbine, respectively generators (not shown). A first and a second blower $2a$ and $2b$ are shown schematically connected to rotary shafts $3a$ and $3b$ of the 1st and 2nd turbine generators, respectively, and are disposed within the 1st and 2nd vessels $1a$ and $1b$, respectively. The 1st and 2nd gas driers $4a$ and $4b$ dry the hydrogen gas coolant enclosed within the 1st and 2nd vessels $1a$ and $1b$, respectively, and are connected to the 1st and 2nd vessels $1a$ and $1b$ through a 1st and a 2nd high pressure pipe $5a$ and $5b$ as well as a 1st and a 2nd low pressure pipe $6a$ and $6b$, respectively. A communicating tube 7 connects 1st and 2nd vessels $1a$ and $1b$ for the purpose of equalizing the pressures of the cooling hydrogen gas coolant within the 1st and 2nd vessels $1a$ and $1b$.

The operation of the apparatus described above and shown in FIG. 1 is as follows:

Upon rotation of rotary shafts $3a$ and $3b$, 1st and 2nd blowers $2a$ and $2b$ rotate. Owing to the wind flow caused by rotating blowers $2a$ and $2b$, the cooling hydrogen gases enclosed within the 1st and 2nd vessels $1a$ and $1b$ flow into the 1st and 2nd gas driers $4a$ and $4b$, respectively, through the respective 1st and 2nd high pressure pipes $5a$ and $5b$, and after drying, the gases return to 1st and 2nd vessels $1a$ and $1b$, respectively, through their respective low pressure pipes $6a$ and $6b$. In this case, the densities of the cooling hydrogen gases within the 1st and 2nd vessels $1a$ and $1b$ are equalized by communication tube 7.

However, in the conventional apparatus explained above, since the air volumes penetrating from the outside into 1st and 2nd vessels $1a$ and $1b$ differ between two vessels $1a$ and $1b$ there arises a very slight difference in the densities of the hydrogen gas coolant between vessels $1a$ and $1b$. Owing to this difference in the densities there arises a difference in the wind pressures induced by the rotations of the 1st and 2nd blowers $2a$ and $2b$, so that there occurs also a difference in the drying of the hydrogen gas coolant within the 1st and 2nd driers $4a$ and $4b$. This difference increases in an accelerating manner as the cooling hydrogen gases circulate so that the pressures within vessels $1a$ and $1b$ do not become equal in spite of the provision of communication tube 7. Further, in one of the turbine generators in which the cooling hydrogen gas density is higher than the other turbine generator the cooling effect is decreased, and the mechanical loss is also increased. Therefore, as the density of the cooling hydrogen gas increases within one of the turbine generators this turbine generator must have the hydrogen gas therein replaced.

Thus, it will be apparent that a study of the conventional pressure density equalizing apparatus reveals various defects.

SUMMARY OF THE INVENTION

It is an object of the present invention to provide a pressure density equalizing apparatus which can overcome all of the defects inherent to the conventional apparatus as described above.

It is another object of the present invention to provide a pressure density equalizing apparatus which allows the pressure densities to be equalized between two vessels during a relatively simple arrangement.

In accordance with the present invention a pressure density equalizing system is provided which comprises 1st and 2nd vessels each enclosing gas coolant, a first gas drier adapted to suck the cooling gas from the 1st vessel and deliver it to the 2nd vessel after drying, and a 2nd gas drier adapted to suck the cooling gas from the 2nd vessel and to deliver it to the 1st vessel after drying.

In accordance with one aspect of the present invention, there are disposed within the 1st and 2nd vessels a 1st and a 2nd blower, respectively, each connected to a rotary shaft of two rotary electric machines, whereby the cooling gases enclosed within the 1st and 2nd vessels are forcibly circulated between them upon rotation of the blowers.

BRIEF DESCRIPTION OF THE DRAWINGS

Other objects of the present invention and the invention itself will be more readily apparent from the following detailed description and the appended drawings, in which drawings:

FIG. 1 is a schematic view of a conventional pressure density equalizing system; and FIG. 2 is a schematic view of one embodiment of the pressure density equalizing system in accordance with the present invention.

DESCRIPTION OF THE PREFERRED EMBODIMENT

Referring now to FIG. 2 of the attached drawings wherein is shown one embodiment of the present invention, the elements identical or similar to those shown in FIG. 1 bear identical reference numerals affixed to them in FIG. 1.

As shown in FIG. 2 a 1st low pressure pipe $6a$ is connected between a 1st gas drier $4a$ and a 2nd vessel $1b$, and a 2nd low pressure pipe $6b$ between a 2nd gas drier $4b$ and a 1st vessel $1a$. It is the same as in the system shown in FIG. 1 that 1st and 2nd driers $4a$ and $4b$ are in communication with 1st and 2nd vessels $1a$ and $1b$, respectively, through first and second high pressure pipes $5a$ and $5b$, respectively.

Now the operation of the embodiment of the present invention described above and shown in FIG. 2 will be explained below.

Upon rotations of 1st and 2nd blowers 2a and 2b, the hydrogen gas coolant within the 1st vessel 1a flows into the 1st gas drier 4a through 1st high pressure pipe 5a, and after drying it flows into the 2nd vessel 1b through the 1st low pressure pipe 6a, while the cooling hydrogen gas within the 2nd vessel 1b flows into the 2nd gas drier 4b through the 2nd high pressure pipe 5b and after drying it flows into the 1st vessel 1a through the 2nd low pressure pipe 6b. Therefore, it is possible to equalize the densities of the cooling hydrogen gases within the 1st and 2nd vessels 1a and 1b.

Although in the embodiment shown in FIG. 2 the connections of the 1st and 2nd low pressure pipes 6a and 6b are differentiated from those in the conventional apparatus as shown in FIG. 1, the connections of the 1st and 2nd high pressure pipes 5a and 5b may instead be similarly differentiated from those in the conventional apparatus shown in FIG. 1.

From the foregoing it will be appreciated that, according to the present invention, by a mere change in the arrangement of pipes of the 1st and 2nd driers, the gas coolant enclosed within the 1st and 2nd vessels can be circulated between them and at the same time effectively dried, while the pressure densities of the gas coolant within the vessels are equalized.

Although a preferred embodiment of the present invention has been described and illustrated, it will be understood by those skilled in the art that modifications may be made in the structure, form and relative arrangement of parts without necessarily departing from the spirit and the scope of the present invention.

What is claimed is:

1. A pressure density equalizing apparatus for a first vessel and a second vessel, both of which contain a gaseous coolant therein, said apparatus comprising:
   a first gas drier and second gas drier, both operatively connected to the first and the second vessels;
   a first high pressure gas pipe means for connecting the first vessel to the first gas drier;
   a second high pressure gas pipe means for connecting the second vessel to the second gas drier;
   a first low pressure gas pipe means for connecting the first gas drier to the second vessel;
   a second low pressure gas pipe means for connecting the second gas drier to the first vessel;
   a first blower mounted on a first rotary shaft in the first vessel; and
   a second blower mounted on a second rotary shaft in the second vessel;
   whereby, upon rotation of the first and second blowers, said gaseous coolant contained in the first and second vessels circulates from the first vessel, through the first high pressure pipe means, into the first gas drier, out of the first gas drier, through the first low pressure pipe means, into the second vessel, and from the second vessel, through the second high pressure pipe means, into the second gas drier, out of the second gas drier, through the second low pressure pipe means, into the first vessel, so that the gas pressure density in the first and the second vessels is equalized.

2. The pressure density equalizing apparatus as recited in claim 1, further comprising:
   tube means for communicating the first and the second vessels directly together with each other.

* * * * *